United States Patent
Elmtalab et al.

(10) Patent No.: US 11,144,421 B2
(45) Date of Patent: Oct. 12, 2021

(54) APPARATUS WITH TEMPERATURE MITIGATION MECHANISM AND METHODS FOR OPERATING THE SAME

(71) Applicant: Micron Technology, Inc., Boise, ID (US)

(72) Inventors: Cyrus Elmtalab, Plymouth, MN (US); Jacob Sloat, Bloomington, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/919,081

(22) Filed: Jul. 1, 2020

(65) Prior Publication Data

US 2021/0200654 A1  Jul. 1, 2021

Related U.S. Application Data

(60) Provisional application No. 62/955,903, filed on Dec. 31, 2019.

(51) Int. Cl.
*G06F 11/00* (2006.01)
*G06F 11/30* (2006.01)
*G06F 12/02* (2006.01)
*G06F 11/07* (2006.01)

(52) U.S. Cl.
CPC ...... *G06F 11/3037* (2013.01); *G06F 11/0793* (2013.01); *G06F 11/3058* (2013.01); *G06F 12/0246* (2013.01)

(58) Field of Classification Search
CPC ............. G06F 11/3037; G06F 11/0793; G06F 11/3058; G06F 11/07; G06F 11/0703; G06F 11/0706; G06F 11/073; G06F 11/0751; G06F 11/0754; G06F 11/30; G06F 11/3003; G06F 11/3065; G06F 11/3089; G06F 12/0246; G06F 12/0238
See application file for complete search history.

(56) References Cited

U.S. PATENT DOCUMENTS

| | | | |
|---|---|---|---|
| 7,099,735 B2* | 8/2006 | Jain | G01K 7/42 374/E7.042 |
| 9,760,136 B2* | 9/2017 | Rangarajan | G11C 29/20 |
| 10,386,899 B2* | 8/2019 | Wang | G06F 11/3017 |
| 10,671,131 B2* | 6/2020 | Kalyanasundaram | G06F 1/3296 |
| 2014/0181595 A1* | 6/2014 | Hoang | G06F 11/3034 714/47.3 |
| 2019/0278510 A1* | 9/2019 | Kaynak | G06F 3/0634 |

OTHER PUBLICATIONS

Shaik, Shehenaz, and Sanjeev Baskiyar. "Proactive thermal aware scheduling." In 2017 Eighth International Green and Sustainable Computing Conference (IGSC), pp. 1-6. IEEE, 2017. (Year: 2017).*

* cited by examiner

*Primary Examiner* — Anthony J Amoroso
(74) *Attorney, Agent, or Firm* — Perkins Coie LLP

(57) ABSTRACT

Methods, apparatuses, and systems related to a memory device are described. The memory device may include a non-volatile (NV) memory and a controller. The controller may be configured to predict a temperature of the NV memory based on a real-time temperature of the controller. Based on the predicted temperature of the NV memory, the controller may execute a remedial action to reduce an actual temperature of the NV memory for executing an upcoming operation.

20 Claims, 4 Drawing Sheets

APPARATUS WITH TEMPERATURE MITIGATION MECHANISM AND METHODS FOR OPERATING THE SAME

CROSS-REFERENCE TO RELATED APPLICATION(S)

This application claims the benefit of U.S. Provisional Application No. 62/955,903, filed Dec. 31, 2019; which is incorporated herein by reference in its entirety.

TECHNICAL FIELD

The disclosed embodiments relate to devices, and, in particular, to semiconductor memory devices with temperature mitigation mechanisms and methods for operating the same.

BACKGROUND

Memory devices may be provided as modules with standard physical formats and electrical characteristics to facilitate easier installation and deployment across multiple systems. One such module is a dual in-line memory module (DIMM), which is frequently used to provide volatile memory such as DRAM to computing systems. Although DRAM can be fast, and therefore well-suited to use as the main memory of computing systems, it is a volatile memory format and thus requires the continuous application of power to maintain the data stored therein. To address this limitation, other modules can provide both volatile memory (for use as the main memory of a system) and non-volatile memory (for backing up the volatile memory in case of power loss) in a single module. One such module is a non-volatile dual in-line memory module (NVDIMM).

NVDIMMs require more complex circuitry than is provided on a DIMM, in order to handle the additional tasks an NVDIMM may be called upon to perform (e.g., power loss detection, backup and restore operations, etc.). The additional circuitry can make the design of an NVDIMM more challenging, especially as the capacity (and therefore the number of memory chips) of the modules increases and the electrical characteristics to which the module must conform to meet the demands of a standard format grow ever more stringent.

DETAILED DESCRIPTION

As described in greater detail below, the technology disclosed herein relates to an apparatus, such as for memory systems, systems with memory devices, related methods, etc., for predicting and managing internal temperatures. The apparatus (e.g., an NVDIMM and/or a system including the NVDIMM) may derive or access in real-time a temperature profile that describes a relationship between temperature at different circuits/portions therein, such as at a controller (e.g., a Field-Programmable Gate Array (FPGA), an application-specific integrated circuit (ASIC), or an on-board processor) and a non-volatile memory device (e.g., FLASH memory) in the NVDIMM. During run-time, the apparatus can obtain real-time temperature data of one or more circuits therein, such as for the controller and/or the FLASH memory, before executing an upcoming operation (e.g., a backup operation, a restore operation, and/or an erase operation). The apparatus can use the real-time temperature data to generate a temperature prediction for the end of the upcoming operation. When the generated temperature prediction (e.g., predicted temperature of the FLASH memory) is greater than a predetermined threshold, the apparatus can detect a potential failure condition and implement one or more remedial processes. Some examples of the remedial processes can include operating a built-in cooling system (e.g., a fan), rescheduling the upcoming operation, increasing a delay between operating cycles, and/or logging the potential failure detection. Accordingly, using the temperature profile and the corresponding real-time temperature prediction, the apparatus can reduce operational failures (e.g., failure to store/recover data accurately and/or achieve a targeted state).

In the following description, numerous specific details are discussed to provide a thorough and enabling description for embodiments of the present technology. One skilled in the relevant art, however, will recognize that the disclosure can be practiced without one or more of the specific details. In other instances, well-known structures or operations often associated with semiconductor devices are not shown, or are not described in detail, to avoid obscuring other aspects of the technology. In general, it should be understood that various other devices, systems, and methods in addition to those specific embodiments disclosed herein may be within the scope of the present technology.

Figure 1:
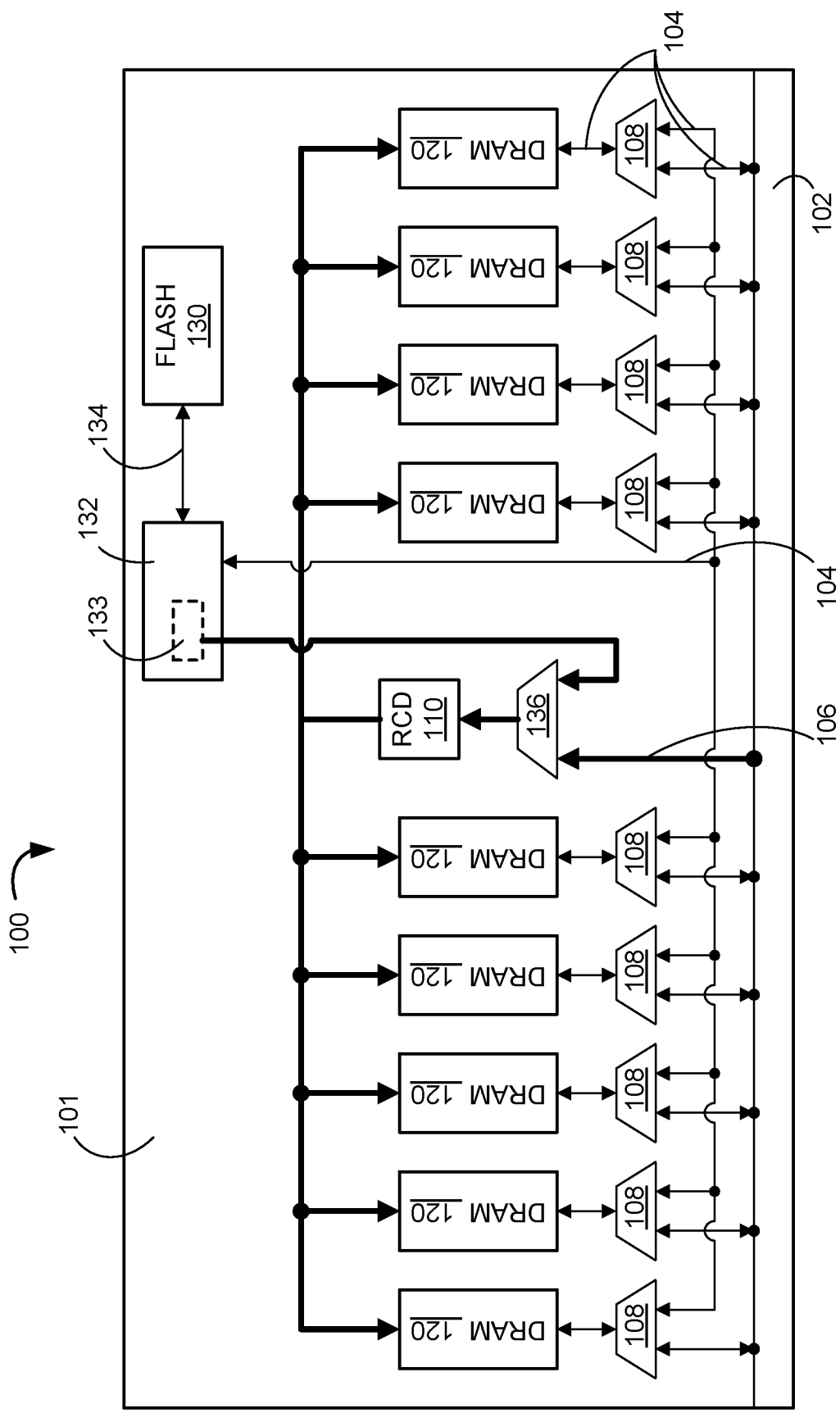
FIG. 1 is a block diagram of an apparatus in accordance with an embodiment of the present technology.

FIG. 1 schematically illustrates a NVDIMM 100 including a plurality of DRAM memories 120 (e.g., memory dies, memory chips, memory packages or the like). The NVDIMM 100 includes an edge connector 102 along an edge of a substrate 101 (e.g., a printed circuit board (PCB) or the like) of the NVDIMM 100 for connecting a data bus 104 and a command/address bus 106 (illustrated in bold lines) to a host device. The data bus 104 connects the DRAM memories 120 to the edge connector 102 and receives data signals from and transmits data signals to a connected host during memory access operations (e.g., reads and writes). The NVDIMM 100 further includes a registering clock driver (RCD) 110 that receives command/address signals from the command/address bus 106 and generates memory command/address signals for the DRAM memories 120. The RCD 110 can present a predictable electrical load (e.g., for matching impedance, reactance, capacitance, etc.) to the host device and can re-drive memory command/address signals to the DRAM memories 120, which helps enable higher densities and increase signal integrity. The RCD 110 may also buffer the command/address signals provided by the host, and then transmit the buffered signals as memory command/address signals to the DRAM memories 120.

The NVDIMM 100 can further include non-volatile (NV) memory 130 (e.g., FLASH memory) and supporting circuitry and devices. The NVDIMM 100 further includes a controller 132 (e.g., an FPGA, an ASIC, or an on-board processor) for controlling the NV memory 130 and performing memory management operations, such as power loss detection, backup from the DRAM memories 120 to the NV memory 130, and restore from the NV memory 130 to the DRAM memories 120. The controller 132 may include a connection to the edge connector 102 (not shown) to facilitate detection of a power loss event (e.g., by monitoring a voltage of a power supply pin, or via a dedicated pin for sending commands from a connected host to the controller 132).

The controller 132 is connected to the NV memory 130 by a non-volatile bus 134 and to the DRAM memories 120 by the data bus 104. In this regard, the data bus 104 may include a number of data multiplexers 108 to facilitate connecting the DRAM memories 120 to both the edge connector 102 (e.g., for receiving data signals from and transmitting data signals to a connected host) and to the controller 132 (e.g., for reading data signals from the DRAM memories 120 during a backup operation and transmitting data signals to the DRAM memories 120 during a restore operation). For example, in an embodiment in which each of nine DRAM memories 120 have eight I/O terminals, the data bus 104 can include eight bus lines connecting each DRAM memory 120 to the corresponding data multiplexer 108, eight bus lines connecting each data multiplexer 108 to the edge connector 102, and eight bus lines connecting each data multiplexer 108 to the controller 132 (e.g., which could be provided with 72 I/O terminals). In another embodiment, a memory module similar to NVDIMM 100 could include a further nine DRAM memories 120 on a back side thereof (for 18 total DRAM memories 120, each having four I/O terminals). In such an embodiment, the data bus 104 could include four bus lines connecting each of the eighteen DRAM memories 120 to a corresponding one of eighteen data multiplexers 108, four bus lines connecting each data multiplexer 108 to the edge connector 102, and four bus lines connecting each data multiplexer 108 to the controller 132 (e.g., which could be provided with 72 I/O terminals).

The controller 132 is further connected to the RCD 110, in order to provide command/address signals to the DRAM memories 120 during backup and restore operations. In this regard, the controller can include a driver 133 for sending command/address signals to the RCD 110, through a command/address multiplexer 136 configured to connect the RCD 110 to both the edge connector 102 and the driver 133 of the controller 132.

As described above, the NVDIMM 100 can facilitate (via, e.g., the controller 132) transfer of stored data between the DRAM memories 120 and the NV memory 130, such as in response to power loss. For such transfer of the stored data, the NVDIMM 100 may execute a backup operation, a restore operation, and/or an erase operation. The backup operation can be for transferring the data from the DRAM memories 120 to the NV memory 130, such as based on detecting a power loss condition. The restore operation can be for transferring the data from the NV memory 130 to the DRAM memories 120, such as when the power is restored for the NVDIMM 100. The erase operation can be for deleting the contents of the NV memory 130, such as by restoring the charge states in the memory cells therein to known predetermined levels.

High temperatures (e.g., temperatures exceeding a threshold) often lead to failures for the NVDIMM 100. As such, one of the ways to mitigate failures within the NVDIMM 100 may be to use built-in temperature sensors within the controller 132 and the NV memory 130. While backup, restore, and erase operations typically result in the hottest temperatures across the NVDIMM 100 and/or the NV memory 130, obtaining the temperature data from the NV memory 130 during execution of such operations may cause operational failures. The backup, restore, and erase operations typically correspond to a short time window and may require maximum or near maximum use of resources for the NV memory 130. As such, sampling temperature data may overburden the resources and cause operational failures (e.g., data errors). Thus, obtaining the temperature data from the NV memory 130 during execution of operations should be minimized to ensure satisfactory execution of the operations.

To track and/or prevent failures without disturbing the operations of the NVDIMM 100, several embodiments of data storage devices and computing systems in accordance with the present technology can provide temperature projections and estimations for the NVDIMM 100 and/or the NV memory 130 therein. The NVDIMM 100 can generate the temperature projections based on a temperature profile (e.g., a pattern or an equation) that correlates temperatures between the controller 132 and the NV memory 130.

To derive the temperature profile, the NVDIMM 100 may obtain temperature data via one or more components therein. In some embodiments, the controller 132, the NV memory 130, the DRAM memories 120, and/or the RCD 110 may include a temperature sensor (e.g., a solid-state sensor) capable of determining and outputting a temperature measurement. The controller 132 may obtain and process the temperature data produced by itself, the NV memory 130, the DRAM memories 120, and/or the RCD 110 to derive the temperature profile. For example, the controller 132 may obtain the temperature data from the NV memory 130 measured immediately before and/or immediately after executing one or more save, restore, and/or erase operations. Also, the controller 132 may obtain temperature data of itself during (e.g., at predetermined sampling intervals) execution of the one or more save, restore, and/or erase operations. The controller 132 can use the two sets of temperature data for the one or more save, restore, and/or erase operations to derive the pattern, the trend, and/or the corresponding equation that describes the relationship between the temperatures at the controller 132 and the NV memory 130. In some embodiments, the NVDIMM 100 can obtain the sets of the temperature data and derive the temperature profile during initial calibration and/or diagnostics during manufacture and/or at device startup.

During operation or run-time, the NVDIMM 100 can track or sample the temperature of the controller 132 and/or the NV memory 130 in real-time, such as before executing a save, a restore, and/or an erase operation. The NVDIMM 100 (via, e.g., the controller 132) can use the real-time temperature of the controller 132 and/or the NV memory 130 as an input to the temperature profile to generate the temperature prediction for the NV memory 130 at the end of the upcoming save, restore, and/or erase operation. The NVDIMM 100 can compare the temperature prediction against a failure temperature threshold to predict a potential failure. When such potential failures are detected, the NVDIMM 100 can initiate one or more remedial measures, such as operating a built-in cooling system (e.g., a fan), rescheduling the upcoming operation, increasing a delay between operating cycles, and/or logging the potential failure detection. Accordingly, using the temperature profile and the corresponding real-time temperature prediction, the NVDIMM 100 can reduce operational failures (e.g., failure to store/recover data accurately and/or achieve a targeted state).

Figure 2:
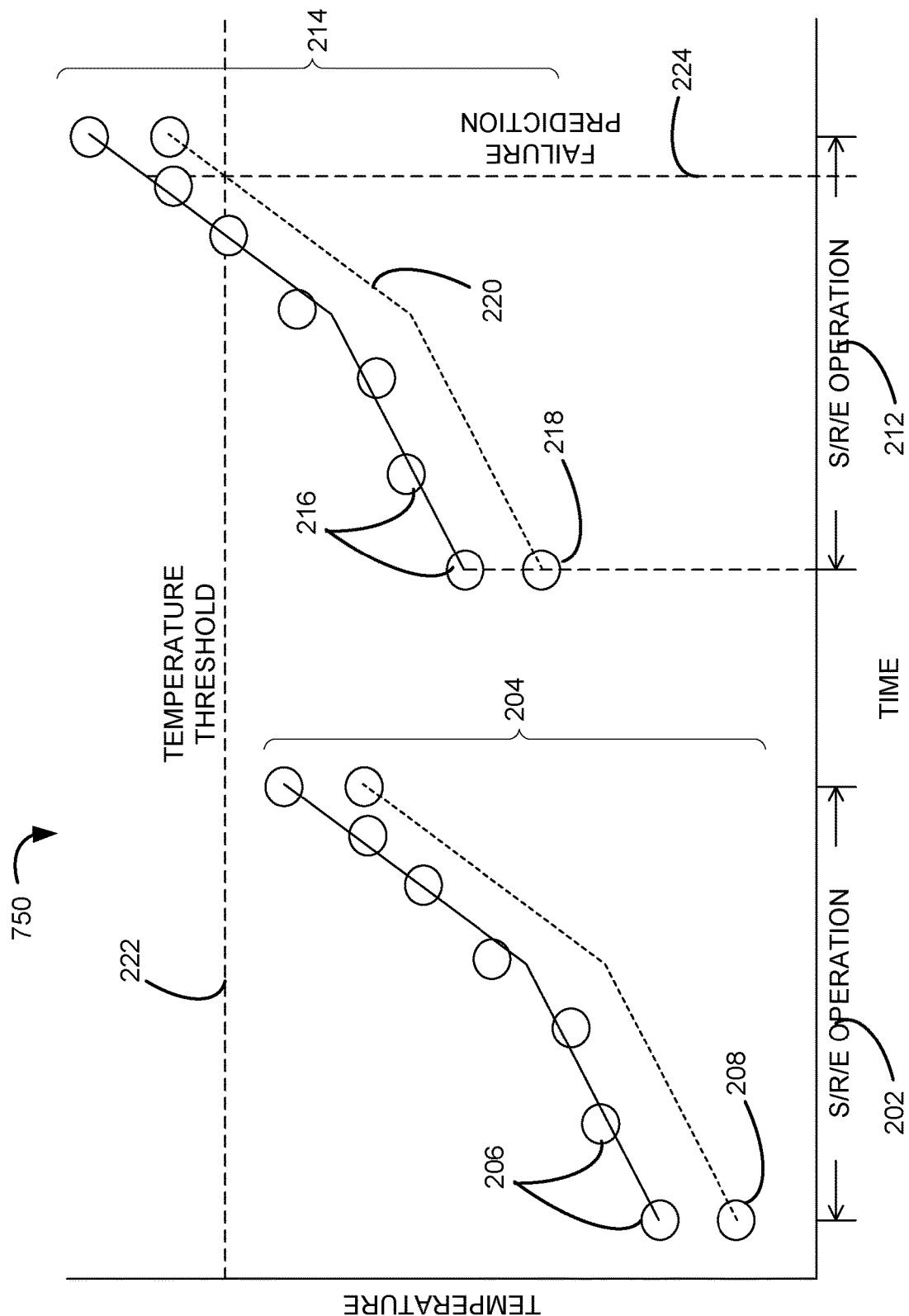
FIG. 2 is an illustration of an example temperature profile in accordance with an embodiment of the present technology.

FIG. 2 is an illustration of an example temperature profile (e.g., a temperature profile 220) in accordance with an embodiment of the present technology. The apparatus (e.g., the NVDIMM 100 of FIG. 1) may be configured to derive the temperature profile based on collecting temperature data while executing one or more save/restore/erase operations. In some embodiments, the NVDIMM 100 may derive the temperature profile 220 according to one or more predetermined times/conditions, such as following power resets, according to predetermined timings, and/or during system setup. Accordingly, the NVDIMM 100 can derive the temperature profile 220 that accurately corresponds to the operating environment for the NVDIMM 100. For example, the derived temperature profile 220 may reflect thermal influences on the NVDIMM 100 from deployment/system conditions, such as housing/cover, air-flow, proximity to other circuits, arrangement/locations of various circuits, etc.

To derive the temperature profile 220, the NVDIMM 100 may obtain temperature data from one or more components while executing a predetermined number or combination of save, restore, and/or erase operations. As an illustrative example, the NVDIMM 100 may execute a first operation 202 and a second operation 212 within a predetermined duration. In some embodiments, the NVDIMM 100 may execute the predetermined number/combination of operations back-to-back (e.g., with minimal to no delay between the executions).

The NVDIMM 100 can obtain a first data set 204 for the first operation 202 and a second data set 214 for the second operation 212. The first data set 204 can include temperature measurements of the controller 132 and/or the NV memory 130 before, during, and/or after execution of the first operation 202. For example, the first data set 204 may include first controller temperatures 206 reported by the controller 132 before, during, and/or after execution of the first operation 202 (e.g., a save, a restore, or an erase operation). In some embodiments, the controller 132 may sample the first controller temperatures 206 at a predetermined sampling frequency. Also, the first data set 204 may include first non-volatile (NV) temperatures 208 reported by the NV memory 130 before and/or after execution of the first operation 202.

Similarly, the second data set 214 can include temperature measurements of the controller 132 and/or the NV memory 130 before, during, and/or after execution of the second operation 212. For example, the second data set 214 may include second controller temperatures 216 reported by the controller 132 before, during, and/or after execution of the second operation 212 (e.g., a save, a restore, or an erase operation). In some embodiments, the controller 132 may sample the second controller temperatures 216 at a predetermined sampling frequency. Also, the second data set 214 may include second NV temperatures 218 reported by the NV memory 130 before and/or after execution of the second operation 212.

The NVDIMM 100 (e.g., the controller 132) may process the first and second data sets 204 and 214 to derive the temperature profile 220 that represents a relationship between temperatures of the controller 132 and the NV memory 130 during execution of save, restore, and/or erase operations. The NVDIMM 100 can derive the temperature profile 220 according to a predetermined process, template, equation, etc. The NVDIMM 100 may also derive the temperature profile 220 according to one or more assumptions, such as that the controller 132 will likely be hotter than the NV memory 130 and/or that the temperatures will consistently rise during execution of operations. The NVDIMM 100 can include one or more predetermined equation formats that correspond to the assumptions. In some embodiments, for example, the NVDIMM 100 can derive the temperature profile 220 according to:

$$\text{NAND temp} = (\text{controller temp} * \alpha) - \beta. \qquad \text{Equation (1).}$$

The NVDIMM 100 can use the first and second data sets 204 and 214 to derive a factor '$\alpha$' and/or an offset '$\beta$' that matches differences between the controller and NAND temperatures. Additionally or alternatively, the NVDIMM 100 may use other equation formats that correspond to second or third order relationships, multiple segment relationships, and/or other behavioral relationships between the two temperature patterns. In some embodiments, the NVDIMM 100 may derive the temperature profile 220 based on selecting one of multiple formats according to corresponding best-fit measures.

Additionally or alternatively, the NVDIMM 100 may derive the temperature profile 220 based on ambient temperatures (e.g., data provided by another sensor). As an illustrative example, the NVDIMM 100 may adjust the factor and/or the offset according to the ambient temperature. When the ambient temperature is below a predetermined selection threshold, the NVDIMM 100 may use the temperature profile 220 that corresponds to the pattern described in Equation (1). When the ambient temperature is above the predetermined selection threshold, the NVDIMM 100 may use the temperature profile 220 that corresponds to:

$$\text{NAND temp} = \text{controller temp} * \gamma. \qquad \text{Equation (2).}$$

The NVDIMM 100 may derive the temperature profile 220 according to the ambient temperature at time when the first and second data sets 204 and 214 obtained. Accordingly, when the ambient temperature was above the predetermined selection threshold when the data was obtained, the NVDIMM 100 can derive the termperature profile 220 based on calculating a factor '$\gamma$', which may be same as or different from factor '$\alpha$'.

Since the second operation 212 is executed relatively shortly after execution of the first operation 202, the temperature measurements for the second data set 214 may be higher than those of the first data set 204. As such, the NVDIMM 100 can derive the temperature profile 220 that predict/characterize temperature patterns that correspond to heat-related failures. Accordingly, the NVDIMM 100 can derive the temperature profile 220 that predicts the temperature of the NV memory 130 exceeding a temperature threshold 222 (e.g., an upper limit on operating temperatures). In some embodiments, the temperature threshold 222 may be predetermined, such as according to specifications of the NV memory 130. In other embodiments, the NVDIMM 100 can determine the temperature threshold 222 (e.g., during initial system set up or after power reset) based on executing the save, restore, and/or erase operations until the NVDIMM 100 fails to recover predetermined/stored information (e.g., an actual failure condition). The NVDIMM 100 can use the NV temperatures measured for the failing execution to dynamically determine the temperature threshold 222.

After deriving, the NVDIMM 100 can use the temperature profile 220 to determine failure predictions 224. During run-time, the NVDIMM 100 can determine the temperature of the controller 132, such as at predetermined intervals and/or before executing a save, a restore, and/or an erase operation. The NVDIMM 100 can calculate temperature predictions for the NV memory 130 based on the determined temperature and the temperature profile 220. For example, the NVDIMM 100 can calculate the temperature predictions using the determined temperature of the controller 132 as an input to the temperature profile 220. The NVDIMM 100 can compare the calculated temperature predictions to the temperature threshold 222. The NVDIMM 100 can determine the failure prediction 224 when the temperature predictions exceed the temperature threshold 222.

In response to determining the failure prediction 224, the NVDIMM 100 may execute remedial operations to lower the current temperatures of the controller 132 and/or the NV memory 130. Accordingly, the NVDIMM 100 can lower the predicted/future temperatures of the controller 132 and/or the NV memory 130, such as for performing the upcoming operation. The NVDIMM 100 may lower the temperatures based on operating an onboard cooling system, such as one or more fans on the substrate 101 of FIG. 1 of the NVDIMM 100 and/or within an overall system that includes the NVDIMM 100. Additionally or alternatively, the NVDIMM 100 may increase a delay or decrease a frequency associated with reoccurring maintenance operations, such as operations associated with the NV memory 130 (e.g., data refresh). Also, the NVDIMM 100 may reschedule the upcoming operation, such as by delaying the execution thereof and/or executing other operations before the upcoming operation. In some embodiments, the NVDIMM 100 may log the failure prediction 224, the upcoming operation, the corresponding time stamps, or a combination thereof for subsequent analysis and/or error correction.

Figure 3:
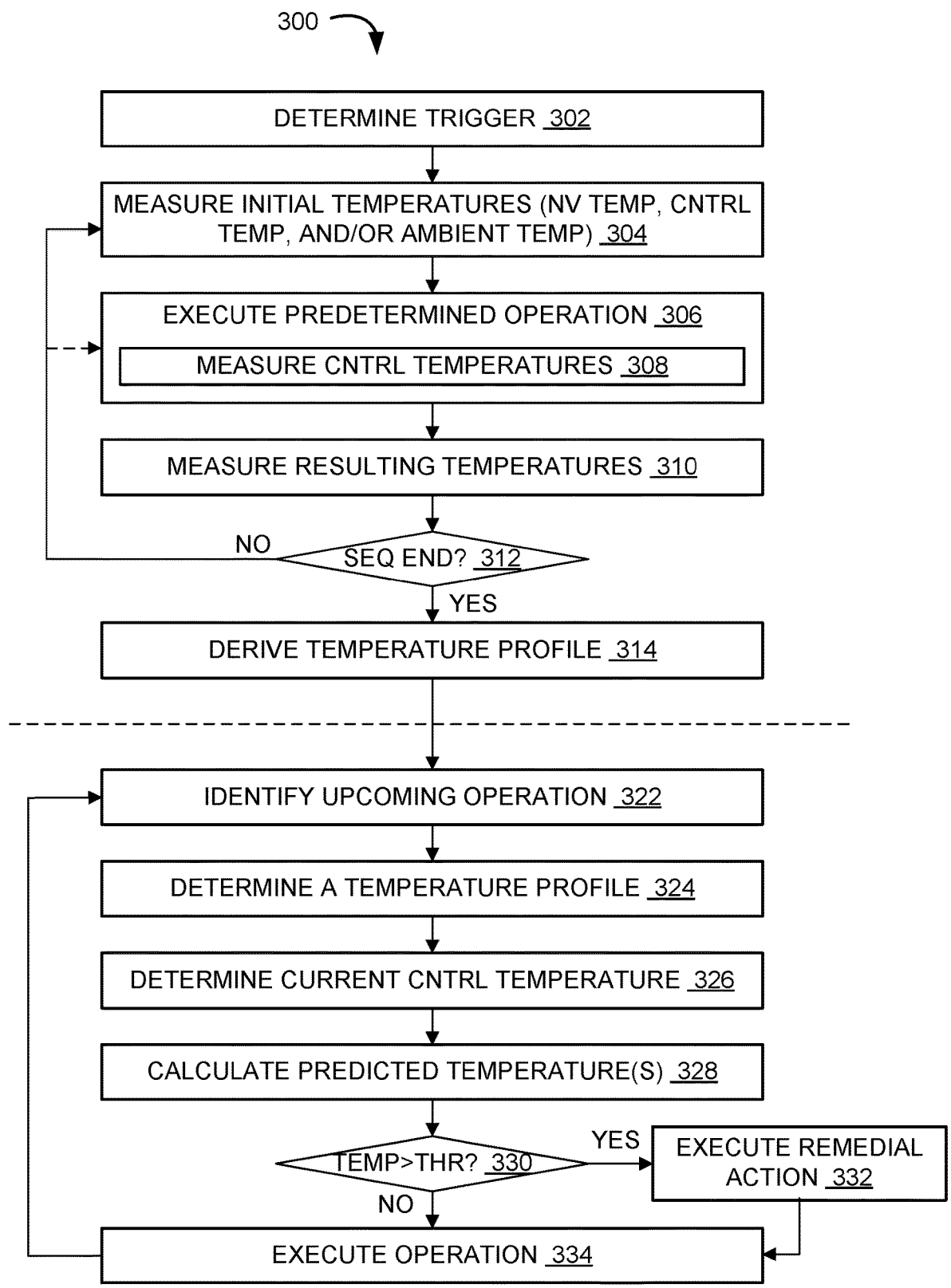
FIG. 3 is a flow diagram illustrating an example method of operating an apparatus in accordance with an embodiment of the present technology.

FIG. 3 is a flow diagram illustrating an example method 300 of operating an apparatus (e.g., the NVDIMM 100 of FIG. 1) in accordance with an embodiment of the present technology. For example, the method 300 can be for deriving the temperature profile 220 of FIG. 2. Also, the method 300 can be for utilizing the temperature profile 220 to manage operations and/or remedial actions. Method 300 is performed, for example, by a memory system (e.g., NVDIMM 100). In some examples, method 300 is performed by a controller (e.g., controller 132) of the memory system. In some examples, method 300 can be implemented in the form of firmware executable by the controller of the memory system. For example, the memory system can store (e.g., in non-transitory computer-readable medium of the memory system) firmware having instructions, which when executed by the controller, cause the memory system to perform any of the operations of method 300.

At block 302, the NVDIMM 100 can determine a trigger for deriving the temperature profile 220. In some embodiments, the NVDIMM 100 can determine the trigger based on a user-input or a system-input that corresponds to a system set-up. For example, a computing system that includes the NVDIMM 100 may execute an application for calibrating the NVDIMM 100 specifically for the operating environment of the computing system. The calibration application can provide a trigger signal for the NVDIMM 100. Additionally or alternatively, the NVDIMM 100 can determine the trigger based on a power-reset event (e.g., a power ramp-up condition and/or a booting sequence). In other words, the NVDIMM 100 may derive in real-time the temperature profile 220 each time the NVDIMM 100 is powered up. The NVDIMM 100 can derive the temperature profile 220 during deployment/operation (e.g., after manufacturing/testing of the NVDIMM 100).

In deriving the temperature profile 220, the NVDIMM 100 may execute a predetermined sequence of operations (e.g., a set of save/restore/erase operations). The NVDIMM 100 can measure temperatures of various components/locations before, during, and/or after each operation in the predetermined sequence of operations. Accordingly, the NVDIMM 100 can derive the temperature profile 220 that characterizes the relationship between temperatures of the NV memory 130 and the controller 132 specifically for an actual operating environment surrounding the NV memory 130 and the controller 132.

At block 304, the NVDIMM 100 can measure initial temperatures. The NVDIMM 100 can measure real-time temperatures of the controller 132 of FIG. 1, the NV memory 130 of FIG. 1, and/or the operating environment before executing an upcoming predetermined operation. For example, the controller 132 can use an onboard temperature sensor to measure/sample the current temperature (e.g., controller temperature data) before executing the upcoming operation. Also, the controller 132 can command the NV memory 130 to sample (via, e.g., onboard temperature sensor) and provide the current temperature (e.g., NV memory temperature data). Further, the controller 132 may command an environmental sensor (not shown) to provide the ambient temperature.

At block 306, the NVDIMM 100 can execute a predetermined operation (e.g., a save operation, a restore operation, or an erase operation). The controller 132 can issue commands and/or transfer data for the predetermined operation. For example, the controller 132 can read from the DRAM memories 120 of FIG. 1 and write the read content into the NV memory 130 for the save operation. Also, the controller 132 can read from the NV memory 130 and write the read content into the DRAM memories 120 for the restore operation. Further, the controller 132 can command the NV memory 130 to set the contents to a predetermined reset/erased state.

While executing the predetermined operation, such as illustrated at block 308, the NVDIMM 100 can measure the controller temperatures in real-time. The controller 132 can use the onboard temperature sensor to measure/sample the current temperature at one or more predetermined times (e.g., according to a predetermined sampling frequency) while executing the operation. The controller 132 can withhold obtaining temperature measurements from the NV memory 130.

At block 310, the NVDIMM 100 can measure real-time temperatures of the controller 132, the NV memory 130, and/or the operating environment after executing the predetermined operation. For example, the controller 132 can obtain the real-time temperatures similarly as described above for block 304.

At decision block 312, the NVDIMM 100 can determine whether the predetermined sequence of operations has ended. When the sequence has not ended, the NVDIMM 100 can measure the initial temperature (block 304) and/or execute the next predetermined operation (block 306). The NVDIMM 100 can repeat the subsequent operations (e.g., blocks 304-312) until the end of the predetermined sequence of operations. Accordingly, the NVDIMM 100 can determine/sample real-time temperatures of the controller 132, the NV memory 130, and/or the ambient environment while executing the predetermined sequence of operations (including, e.g., the first and second operations 202 and 212 of FIG. 2) after deployment. The NVDIMM 100 can obtain the first and second data sets 204 and 214 of FIG. 2 (e.g., the first and second controller temperatures 206 and 216 of FIG. 2, the first and second NV temperatures 208 and 218 of FIG. 2) associated with execution of the operations.

In some embodiments, for example, the NVDIMM 100 can determine the NV temperatures at least before and/or after the execution of each operation in the predetermined sequence of operations. The NVDIMM 100 can determine the controller temperatures at least during the execution of each operation in the predetermined sequence of operations.

The NVDIMM 100 may not sample the FLASH temperature, and thus the data sets can exclude or be without measurements taken during the execution of each operation in the predetermined sequence of operations. Further, the NVDIMM 100 can obtain the ambient temperature measurement associated with the execution of each operation in the predetermined sequence of operations.

When the sequence ends, such as illustrated at block 314, the NVDIMM 100 can derive the temperature profile 220 based on the obtained NV temperatures, controller temperatures, and/or the ambient temperatures. The NVDIMM 100 can use the measured temperatures to derive the temperature profile 220 that predicts a temperature of the NV memory 130 during execution of an operation based on a real-time temperature of the controller 132.

In some embodiments, the NVDIMM 100 (e.g., the controller 132) can derive the temperature profile 220 according to a set of predetermined assumptions. For example, in deriving the temperature profile 220, the NVDIMM 100 can use a template, a process, and/or an equation that assumes (1) temperatures of the controller 132 are/will be higher than temperatures of the NV memory 130 during execution of an operation, (2) the temperatures of the NV memory 130 will consistently rise across execution of an operation, and/or (3) the temperatures of the controller 132 and the NV memory 130 have a linear relationship. Based on the corresponding template, the process, and/or the equation, the NVDIMM 100 can derive the temperature profile 220 based on scaling and offsetting the measured controller temperatures (e.g., the first and/or the second controller temperatures 206 and/or 216) to fit within the measured NV temperatures (e.g., the first and/or the second NV temperatures 208 and/or 218).

As an illustrative example, the NVDIMM 100 can derive best fit plots for the measured controller temperatures according to a set of predetermined profile templates, such as a linear pattern, a logarithmic pattern, a quadratic pattern, an exponential pattern, etc. The NVDIMM 100 can calculate a deviation measure for each of the best-fit plots, and derive the temperature profile 220 based on one of the best-fit plots corresponding to a lowest deviation measure. Additionally or alternatively, the NVDIMM 100 may use one or more curve fitting mechanisms to derive the best fit plot for the measured controller temperatures. The NVDIMM 100 can calculate an offset measure that places a portion of the resulting curve (e.g., a mid-point) between the NV temperatures at beginning and end of the corresponding operation. The NVDIMM 100 can further calculate a scalar factor that brings the ends of the resulting curve closest to the NV temperatures. The NVDIMM 100 can derive the temperature profile 220 based on the best-fit curve and the calculated offset and the scalar factor. In other words, the NVDIMM 100 can derive the temperature profile 220 based on deriving a curve that connects the NV temperatures and has a shape and/or a pattern matching that of the controller temperatures. In some embodiments, the scalar factor can correspond to 'α' and the offset can correspond to 'β' of Equation (1) as described above.

The NVDIMM 100 may derive the temperature profile 220 according to the ambient temperature measurements. As described above, the NVDIMM 100 can calculate/use patterns and/or factors according to ambient temperatures that correspond to the execution of the operations. For example, when the ambient temperature is below a threshold level, the NVDIMM 100 can derive the temperature profile 220 according to Equation (1). Also, when the ambient temperature is above the threshold level, the NVDIMM 100 can derive the temperature profile 220 according to Equation (2). In some embodiments, the NVDIMM 100 can use the above-described processes to derive the temperature profile 220 that separately describes the temperatures resulting from the save operation, the restore operation, and/or the erase operation.

Accordingly, the NVDIMM 100 can derive the temperature profile 220 according to actual execution of operations and the actual temperatures. As a result, the temperature profile 220 can account for the variance in the actual system and the environment that surrounds or encompasses the NVDIMM 100. The accurate characterization of the operating environment increases the accuracy of the temperature predictions, which can further provide reduction in temperature-related failures and/or increase efficiency by reducing safety margins associated with protections against temperature-related failures.

After deriving the temperature profile 220, the NVDIMM 100 may begin normal operation. During operation, the NVDIMM 100 may be triggered to perform one or more targeted operation, such as a save operation, a restore operation, and/or an erase operation associated with the NV memory 130. At block 322, the NVDIMM 100 can identify an upcoming instance of the targeted operation. For example, the NVDIMM 100 can identify conditions (e.g., power levels and/or patterns thereof) and/or incoming commands associated with predetermined operations that increase the temperature over a threshold amount, such as the save, restore, and/or erase operations.

At block 324, the NVDIMM 100 can determine the temperature profile 220. In some embodiments, the NVDIMM 100 can determine the temperature profile 220 based on accessing the results of the above-described derivations. Accordingly, the NVDIMM 100 can determine/access the temperature profile 220 that characterizes a relationship between temperatures of the NV memory 130 and the controller 132 and/or thermal characteristics of the operating environment. The NVDIMM 100 may select a portion of the temperature profile 220 (e.g., a characterization of a save operation, a restore operation, or an erase operation) that matches the upcoming operation. Also, the NVDIMM 100 may obtain the current ambient temperature and select a portion of the temperature profile 220 that corresponds to the current ambient temperature.

At block 326, the NVDIMM 100 can determine a current controller temperature. For example, the controller 132 can sample the controller temperature in real-time, such as by commanding the onboard sensor. The controller 132 can sample the controller temperature before executing the upcoming operation.

At block 328, the NVDIMM 100 can calculate one or more predicted temperatures of the NV memory 130 based on the temperature profile 220 and the current controller temperature. The NVDIMM 100 can use the current controller temperature as an input to the temperature profile 220 to calculate the one or more predicted temperatures that correspond to execution of the upcoming operation. In other words, the NVDIMM 100 can use the temperature profile 220 and the current controller temperature to predict the temperatures of the NV memory 130 in the event that the NVDIMM 100 executes the upcoming operation. In some embodiments, the NVDIMM 100 can calculate the predicted temperature of the NV memory 130 that would occur at the end of executing the upcoming operation.

At decision block 330, the NVDIMM 100 can compare the one or more predicted temperatures to a temperature threshold. For example, the controller 132 can compare the predicted temperature(s) to a predetermined temperature threshold of the NV memory 130. In other embodiments, the controller 132 can compare the predicted temperature(s) to a dynamically determined temperature threshold. For example, the NVDIMM 100 can execute the predetermined operations and verify the results until a failure (e.g., data error) is detected. When the one or more predicted temperatures do not exceed the temperature threshold, the NVDIMM 100 can execute the upcoming operation as illustrated at block 334.

When the one or more predicted temperatures exceed the temperature threshold, the NVDIMM 100 can determine a failure prediction. According to the failure prediction, at block 332, the NVDIMM 100 can execute one or more remedial actions for the upcoming operation. For example, the NVDIMM 100 can execute the remedial action for lowering the predicted temperatures of the NV memory 130 associated with executing the upcoming operation. Some examples of the remedial action may include operating a cooling system within the NVDIMM 100, increasing a delay between operation cycles (e.g., refresh rates), rescheduling the upcoming operation, and/or logging the data for later failure analysis. The NVDIMM 100 may execute the upcoming operation as illustrated at block 334 after implementing the remedial action.

The failure prediction based on the temperature profile 220 and real-time temperature measurements may mitigate failures via the remedial action. The NVDIMM may further predict a time for the error corruption, thereby improving the ability to correct the data corruption.

Figure 4:
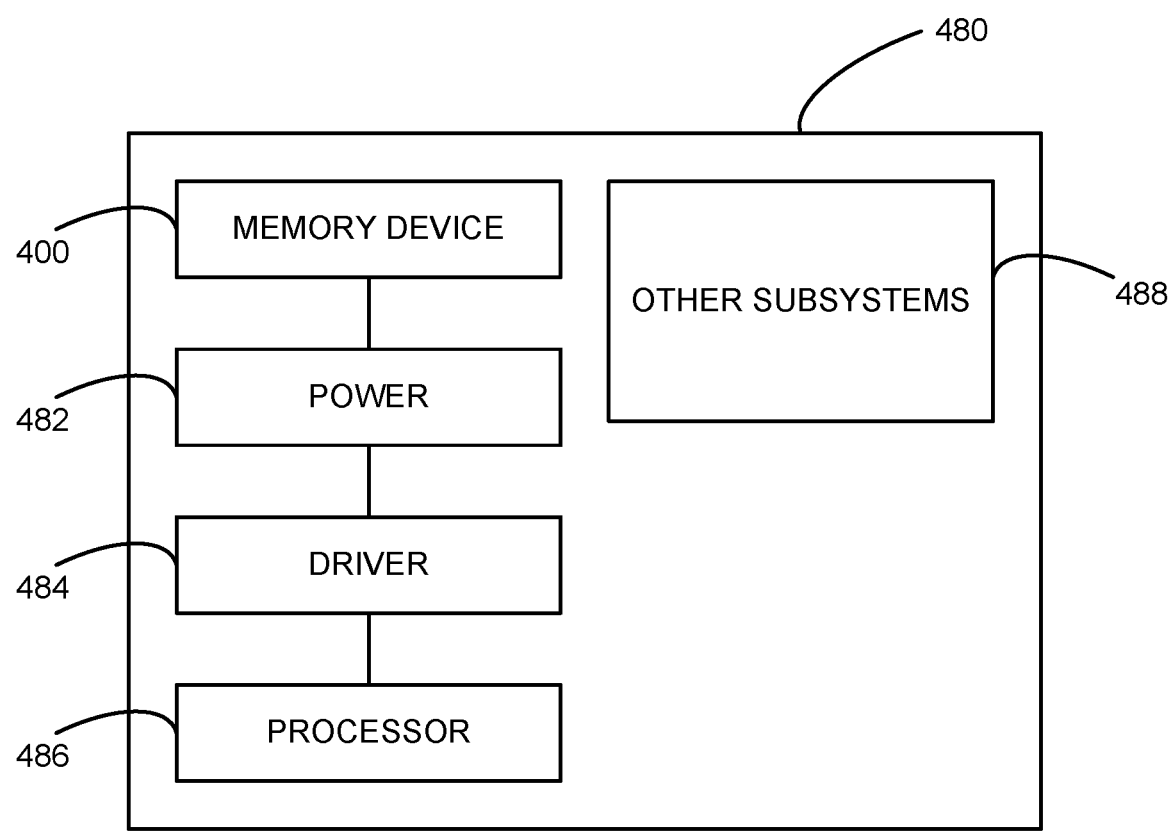
FIG. 4 is a schematic view of a system that includes an apparatus in accordance with an embodiment of the present technology.

FIG. 4 is a schematic view of a system that includes an apparatus in accordance with embodiments of the present technology. Any aspects of the foregoing embodiments (e.g., memory devices and/or corresponding method) described above with reference to FIGS. 1-3 can be incorporated into any of a myriad of larger and/or more complex systems, a representative example of which is system 480 shown schematically in FIG. 4. The system 480 can include a memory device 400, a power source 482, a driver 484, a processor 486, and/or other subsystems or components 488. The memory device 400 can include features generally similar to those of the embodiments described above with reference to FIGS. 1-3, and can therefore include various features for performing a direct read request from a host device. The resulting system 480 can perform any of a wide variety of functions, such as memory storage, data processing, and/or other suitable functions. Accordingly, representative systems 480 can include, without limitation, handheld devices (e.g., mobile phones, tablets, digital readers, and digital audio players), computers, vehicles, appliances and other products. Components of the system 480 may be housed in a single unit or distributed over multiple, interconnected units (e.g., through a communications network). The components of the system 480 can also include remote devices and any of a wide variety of computer readable media.

From the foregoing, it will be appreciated that specific embodiments of the technology have been described herein for purposes of illustration, but that various modifications may be made without deviating from the disclosure. In addition, certain aspects of the new technology described in the context of particular embodiments may also be combined or eliminated in other embodiments. Moreover, although advantages associated with certain embodiments of the new technology have been described in the context of those embodiments, other embodiments may also exhibit such advantages and not all embodiments need necessarily exhibit such advantages to fall within the scope of the technology. Accordingly, the disclosure and associated technology can encompass other embodiments not expressly shown or described herein.

In the illustrated embodiments above, the apparatuses have been described in the context of DRAM devices. Apparatuses configured in accordance with other embodiments of the present technology, however, can include other types of suitable storage media in addition to or in lieu of DRAM devices, such as, devices incorporating NAND-based or NOR-based non-volatile storage media (e.g., NAND flash), magnetic storage media, phase-change storage media, ferroelectric storage media, etc.

The term "processing" as used herein includes manipulating signals and data, such as writing or programming, reading, erasing, refreshing, adjusting or changing values, calculating results, executing instructions, assembling, transferring, and/or manipulating data structures. The term data structure includes information arranged as bits, words or code-words, blocks, files, input data, system-generated data, such as calculated or generated data, and program data. Further, the term "dynamic" as used herein describes processes, functions, actions or implementation occurring during operation, usage or deployment of a corresponding device, system or embodiment, and after or while running manufacturer's or third-party firmware. The dynamically occurring processes, functions, actions or implementations can occur after or subsequent to design, manufacture, and initial testing, setup or configuration.

The above embodiments are described in sufficient detail to enable those skilled in the art to make and use the embodiments. A person skilled in the relevant art, however, will understand that the technology may have additional embodiments and that the technology may be practiced without several of the details of the embodiments described above with reference to FIGS. 1-4.

What is claimed is:

1. An apparatus, comprising:
    a non-volatile (NV) memory; and
    a controller coupled to the NV memory and configured to:
        determine a temperature profile that characterizes a relationship between temperatures of the NV memory and the controller;
        identify an upcoming operation of the NV memory;
        determine a controller temperature in real-time before executing the upcoming operation;
        calculate at least one predicted temperature of the NV memory during and/or after execution of the upcoming operation based on the controller temperature and the temperature profile; and
        execute a remedial action for the upcoming operation, wherein the remedial action is based on the predicted temperature.

2. The apparatus of claim 1, wherein the controller is configured to determine the temperature profile based on:
    executing a predetermined sequence of operations after deployment of the apparatus;
    determining NV temperatures in real-time for execution of each operation in the predetermined sequence of operations;
    determining controller temperatures in real-time for the execution of each operation in the predetermined sequence of operations; and
    deriving the temperature profile based on the NV temperatures and the controller temperatures.

3. The apparatus of claim 2, wherein the controller is configured to:

determine the NV temperatures at least before and after the execution of each operation in the predetermined sequence of operations;

determine the controller temperatures at least during the execution of each operation in the predetermined sequence of operations; and derive the temperature profile that predicts a temperature of the NV memory during execution of a future operation based on a real-time temperature of the controller.

4. The apparatus of claim 3, wherein the controller is configured to derive the temperature profile according to a set of assumptions that include (1) temperatures of the controller are higher than temperatures of the NV memory during execution of the future operation, (2) the temperatures of the NV memory will consistently rise across execution of the future operation, and/or (3) the temperatures of the controller and the NV memory have a linear relationship.

5. The apparatus of claim 3, wherein the controller is configured to derive the temperature profile based on scaling and offsetting the controller temperatures to fit within the NV temperatures.

6. The apparatus of claim 5, wherein the controller is configured to derive the temperature profile according to 'NV temperature=(controller temperature*α)+β', wherein α and β are calculated according to the NV temperatures and the controller temperatures.

7. The apparatus of claim 2, wherein the controller is configured to:

obtain an ambient temperature measurement associated with the execution of each operation in the predetermined sequence of operations; and derive the temperature profile according to the ambient temperature measurements.

8. The apparatus of claim 2, wherein the controller is configured to derive the temperature profile based on:

deriving best-fit plots for the controller temperatures according to a set of profile templates;

calculating a deviation measure for each of the best-fit plots; and deriving the temperature profile based on one of the best-fit plots corresponding to a lowest deviation measure.

9. The apparatus of claim 1, wherein the temperature profile characterizes the relationship between temperatures of the NV memory and the controller for an operating environment surrounding the NV memory and the controller.

10. The apparatus of claim 1, wherein the controller is configured to:

determine a failure prediction when the at least one predicted temperature of the NV memory exceeds a temperature threshold; and execute the remedial action for lowering the at least one predicted temperature of the NV memory associated with executing the upcoming operation.

11. The apparatus of claim 10, wherein the remedial action includes (1) operating a cooling system, (2) increasing a delay between operation cycles, and/or (3) rescheduling the upcoming operation.

12. The apparatus of claim 1, further comprising a dynamic random-access memory (DRAM) coupled to the controller.

13. The apparatus of claim 12, wherein the upcoming operation is a backup operation, a restore operation, or an erase operation associated with the NV memory, wherein:

the backup operation is for transferring runtime data from the DRAM to the NV memory, the restore operation is for transferring backup data from the NV memory to the DRAM, and the erase operation is for resetting data stored on the NV memory to a predetermined value.

14. A non-volatile dual in-line memory module (NVDIMM), comprising:

a dynamic random-access memory (DRAM);

a non-volatile (NV) memory; and a controller coupled to the NV memory and the DRAM and configured to:

determine a temperature profile after a power reset based on measuring in real-time temperatures of the NV memory and the controller for a sequence of predetermined operations, wherein the temperature profile characterizes a relationship between the temperatures of the NV memory and the controller;

identify an upcoming operation of the NV memory, wherein the upcoming operation includes exchanging data between the DRAM and the NV memory and/or erasing data stored in the NV memory;

determine a current controller temperature in real-time before executing the upcoming operation;

calculate a predicted temperature of the NV memory based on the current controller temperature and the temperature profile, wherein the predicted temperature estimates a temperature of the NV memory during or at the end of the upcoming operation; and execute a remedial action for the upcoming operation based on the predicted temperature, wherein the remedial action is for lowering the current temperature of the NV memory.

15. A method of operating an apparatus, the method comprising:

determining a temperature profile that characterizes a relationship between temperatures of a non-volatile (NV) memory and a controller;

identifying an upcoming operation of the NV memory;

determining a controller temperature in real-time before executing the upcoming operation;

calculating at least one predicted temperature of the NV memory during and/or after execution of the upcoming operation based on the controller temperature and the temperature profile; and executing a remedial action for the upcoming operation, wherein the remedial action is based on the predicted temperature.

16. The method of claim 15, wherein determining the temperature profile includes:

executing a predetermined sequence of operations after deployment of the apparatus;

determining NV temperatures in real-time for execution of each operation;

determining controller temperatures in real-time for the execution of each operation in the predetermined sequence of operations; and deriving the temperature profile based on the NV temperatures and the controller temperatures.

17. The method of claim 16, wherein:

determining the NV temperatures includes sampling the NV temperatures at least before and after the execution of each operation in the predetermined sequence of operations;

determine the controller temperatures includes sampling the controller temperatures at least during the execution of each operation in the predetermined sequence of operations; and deriving the temperature profile includes deriving the temperature profile that predicts a temperature of the NV memory during execution of a future operation based on a real-time temperature of the controller.

18. The method of claim 17, wherein the predetermined sequence of operations includes one or more of: a save operation, a restore operation, and/or an erase operation associated with the NV memory.

19. The method of claim 17, wherein the NV temperatures exclude measurements taken during the execution of each operation in the predetermined sequence of operations.

20. The method of claim 17, further comprising:
  obtaining an ambient temperature measurement associated with the execution of each operation in the predetermined sequence of operations; and
  deriving the temperature profile includes deriving the temperature profile according to the ambient temperature measurements.

* * * * *